United States Patent
Choi et al.

(10) Patent No.: US 9,906,286 B2
(45) Date of Patent: Feb. 27, 2018

(54) METHOD FOR TRANSMITTING, BY TERMINAL, CSI FEEDBACK IN HETEROGENEOUS CELLULAR ENVIRONMENT

(71) Applicant: LG ELECTRONICS INC., Seoul (KR)

(72) Inventors: Hyeyoung Choi, Seoul (KR); Jaehoon Chung, Seoul (KR); Iimu Byun, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 14/888,406

(22) PCT Filed: May 21, 2014

(86) PCT No.: PCT/KR2014/004538
§ 371 (c)(1),
(2) Date: Oct. 30, 2015

(87) PCT Pub. No.: WO2014/189285
PCT Pub. Date: Nov. 27, 2014

(65) Prior Publication Data
US 2016/0134351 A1 May 12, 2016

Related U.S. Application Data

(60) Provisional application No. 61/826,502, filed on May 23, 2013.

(51) Int. Cl.
*H04B 7/06* (2006.01)
*H04W 16/02* (2009.01)
(Continued)

(52) U.S. Cl.
CPC ......... *H04B 7/0626* (2013.01); *H04B 7/0619* (2013.01); *H04L 1/0026* (2013.01);
(Continued)

(58) Field of Classification Search
CPC .... H04B 7/0626; H04B 7/0619; H04L 1/0026
See application file for complete search history.

(56) References Cited

U.S. PATENT DOCUMENTS

2013/0121301 A1 5/2013 Kim et al.
2014/0293893 A1* 10/2014 Papasakellariou .... H04W 72/04
370/329

FOREIGN PATENT DOCUMENTS

KR 10-2010-0131341 12/2010
KR 10-2012-0109546 10/2012
(Continued)

OTHER PUBLICATIONS

Sharp, "PCell vs SCell with PUCCH for inter-eNB CA", R2-132052, 3GPP TSG-RAN WG2 #82, May 2013, 6 pages.*
(Continued)

*Primary Examiner* — Siming Liu
(74) *Attorney, Agent, or Firm* — Lee, Hong, Degerman, Kang & Waimey

(57) ABSTRACT

Disclosed are a terminal and a CSI feedback method of a terminal, comprising the steps of: classifying cells into one or more cell groups on the basis of cell IDs of the cells set in a terminal; selecting a representative cell representing other cells belonging to each cell group; and transmitting a CSI feedback on the cells belonging to each cell group to at least one of a macro cell and a small cell connected to the terminal by using the representative cell selected in each cell group.

10 Claims, 8 Drawing Sheets

(51) Int. Cl.
  *H04L 1/00* (2006.01)
  *H04W 16/32* (2009.01)
  *H04W 72/04* (2009.01)
  *H04L 5/00* (2006.01)
(52) U.S. Cl.
  CPC ........... *H04L 5/0057* (2013.01); *H04W 16/02* (2013.01); *H04W 16/32* (2013.01); *H04W 72/0413* (2013.01); *H04L 5/001* (2013.01)

(56) References Cited

FOREIGN PATENT DOCUMENTS

| | | |
|---|---|---|
| KR | 10-2013-0018841 | 2/2013 |
| KR | 10-2013-0048253 | 5/2013 |
| WO | 2010/064794 | 6/2010 |

OTHER PUBLICATIONS

PCT International Application No. PCT/KR2014/004538, Written Opinion of the International Searching Authority dated Aug. 25, 2014, 11 pages.
European Patent Office Application Serial No. 14801367.5, Search Report dated Dec. 23, 2016, 10 pages.
Sharp, "PCell vs. SCell with PUCCH for inter-eNB CA", R2-132052, 3GPP TSG-RAN WG2 #82, May 2013, 6 pages.
Etri, "CA extension in support of inter-site CA", R1-132558, 3GPP TSG RAN WG1 Meeting #73, May 2013, 3 pages.
3rd Generation Partnership Project (3GPP), "Technical Specification Group Radio Access Network; Evolved Universal Terrestrial Radio Access (E-UTRA); Radio Resource Control (RRC); Protocol specification (Release 11)," 3GPP TS 36.331 V11.3.0, Mar. 2013, 344 pages.

* cited by examiner

MeNB : macro eNode B
PeNB : pico eNodeB
FeNB : femto eNode B

MUE : macro UE
PUE : pico UE
FUE : femto UE

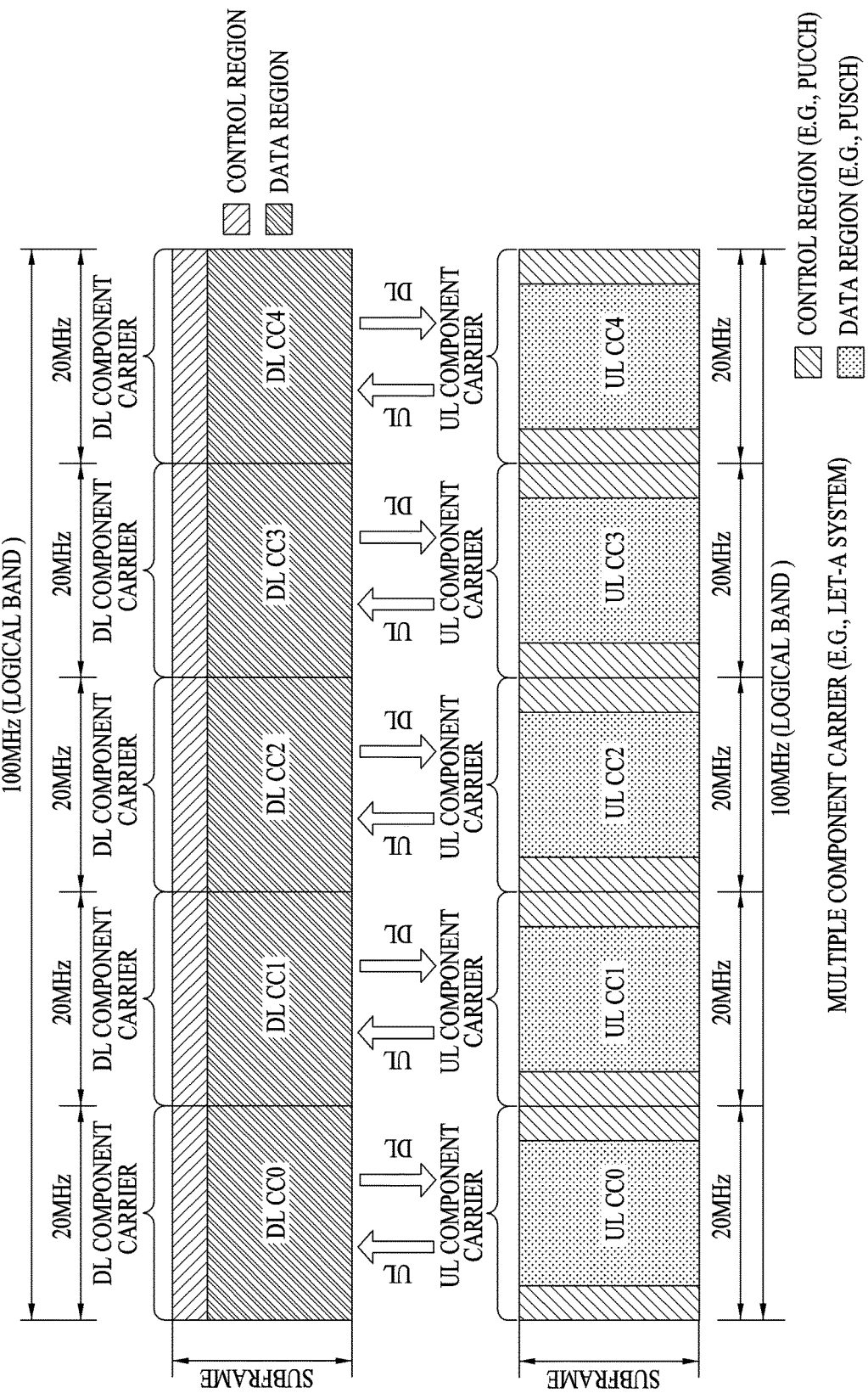

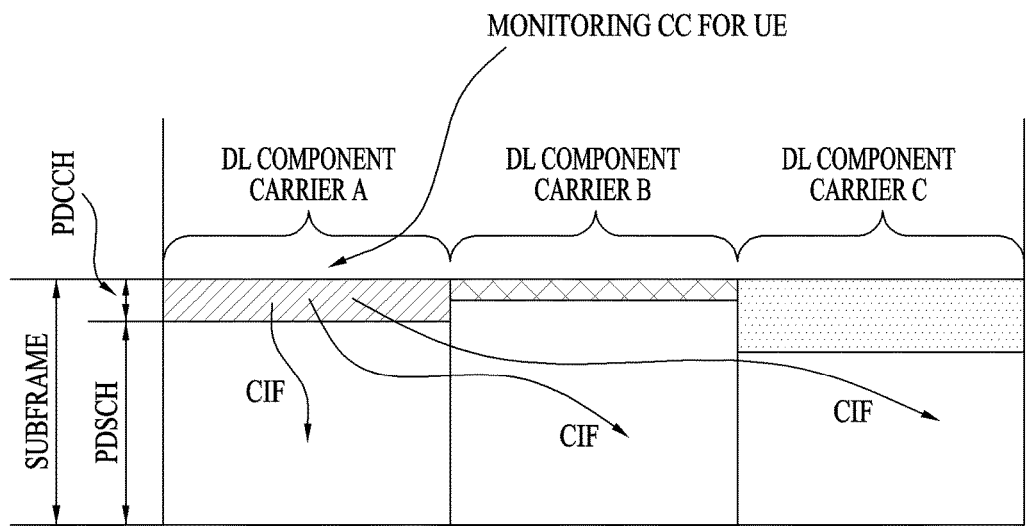
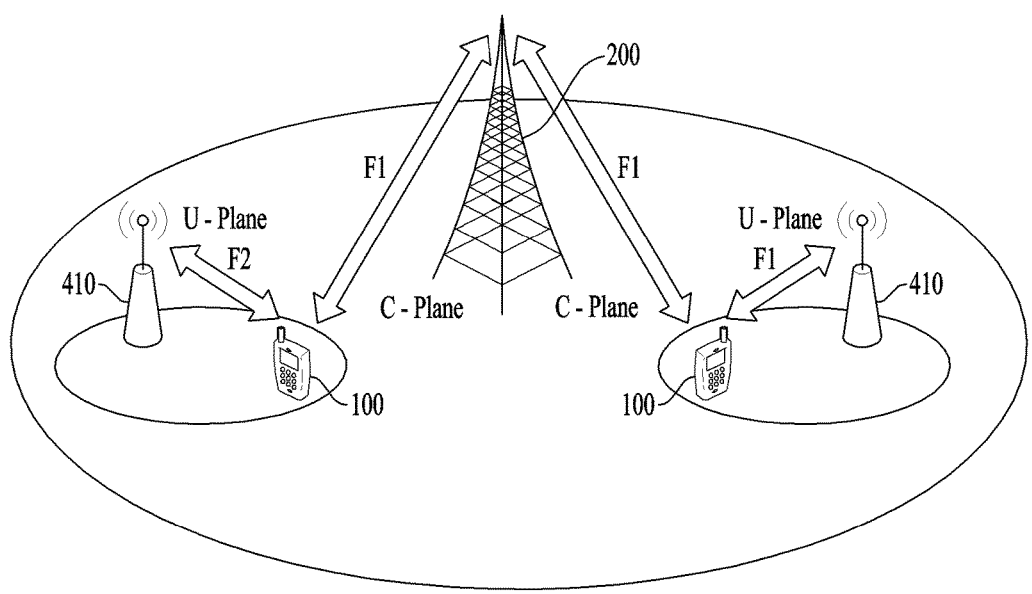

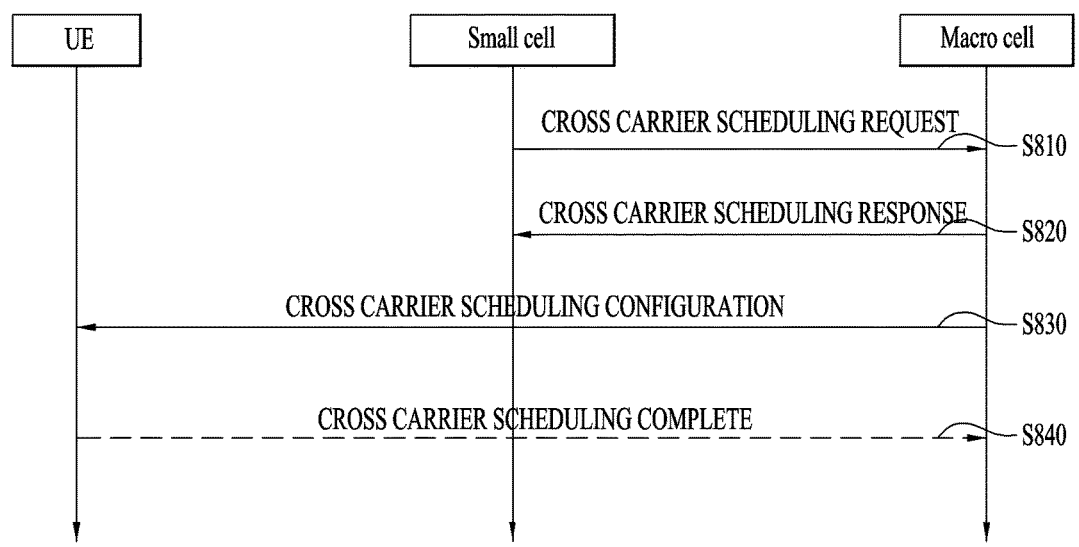

METHOD FOR TRANSMITTING, BY TERMINAL, CSI FEEDBACK IN HETEROGENEOUS CELLULAR ENVIRONMENT

CROSS-REFERENCE TO RELATED APPLICATIONS

This application is the National Stage filing under 35 U.S.C. 371 of International Application No. PCT/KR2014/004538, filed on May 21, 2014, which claims the benefit of U.S. Provisional Application No. 61/826,502, filed on May 23, 2013, the contents of which are all hereby incorporated by reference herein in their entirety.

TECHNICAL FIELD

The present invention relates to a method for transmitting channel state information (CSI) feedback by a user equipment (UE) in a in a heterogeneous cell deployment in which a macro base station (BS) and a small BS coexist.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network.

It is inefficient to additionally install a macro cell eNB in a complex urban environment like in a conventional art. This is because system throughput enhancement is not high compared with increase in costs and complexity for additional installment of macro cells due to shadow areas of a communication environment. Accordingly, in a new heterogeneous cell structure, a plurality of small cells coexists in a macro cell and serves corresponding UEs by resource allocation based on cell coordination. The heterogeneous cell structure is used to enhance quality of experience (QoE) by providing a high data transmission rate to a last user.

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conduced to draw advantages of concept of dual connectivity to small cell layers and a macro cell layer in which a user uses the same or different carriers.

DISCLOSURE

Technical Problem

An object of the present invention devised solve the problem lies in also effectively forwarding channel state information (CSI) feedback to base stations (BSs) when a user equipment (UE) has dual connectivity in a heterogeneous cell deployment in which a macro BS and a small BS coexist.

Another object of the present invention devised to solve the problem lies in classifying a cell group and transmitting CSI feedback through a representative cell selected for each cell group so as to reliably transmit CSI feedback to a BS that allocates a cell to a UE.

Another object of the present invention devised to solve the problem lies in transmitting CSI feedback to which a network situation is reflected by dynamically adjusting a target to which feedback is to be transmitted irrespective of a set cell group.

It is to be understood that both the foregoing general description and the following detailed description of the present invention are exemplary and explanatory and are intended to provide further explanation of the invention as claimed.

Technical Solution

The object of the present invention can be achieved by allowing user equipments (UEs) with dual connectivity to classify a cell group and to transmit channel state information (CSI) feedback through a representative cell to effectively transmit CSI feedback in a heterogeneous cell deployment.

Advantageous Effects

Exemplary embodiments of the present invention may have the following advantages.

First, a user equipment (UE) with dual connectivity may effectively forward channel state information (CSI) feedback to base stations (BSs) connected to the UE.

Second, a cell group may be classified and CSI feedback may be transmitted through a representative cell selected for each cell group so as to reliably CSI feedback to a BS.

Third, a target of transmission of CSI feedback may be changed in consideration of communication link quality, CSI feedback speed, or the like to dynamically correspond to change in a network situation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating carrier aggregation according to the present invention;

FIG. 3 is a diagram illustrating cross scheduling in the case of aggregation of a plurality of carriers according to the present invention;

FIG. 4 is a diagram for explanation of dual connectivity according to the present invention;

FIG. 7 is a diagram for explanation of a CSI feedback method according to another embodiment of the present invention;

FIG. 8 is a diagram for explanation of a CSI feedback method according to another embodiment of the present invention;

BEST MODE

Figure 1:
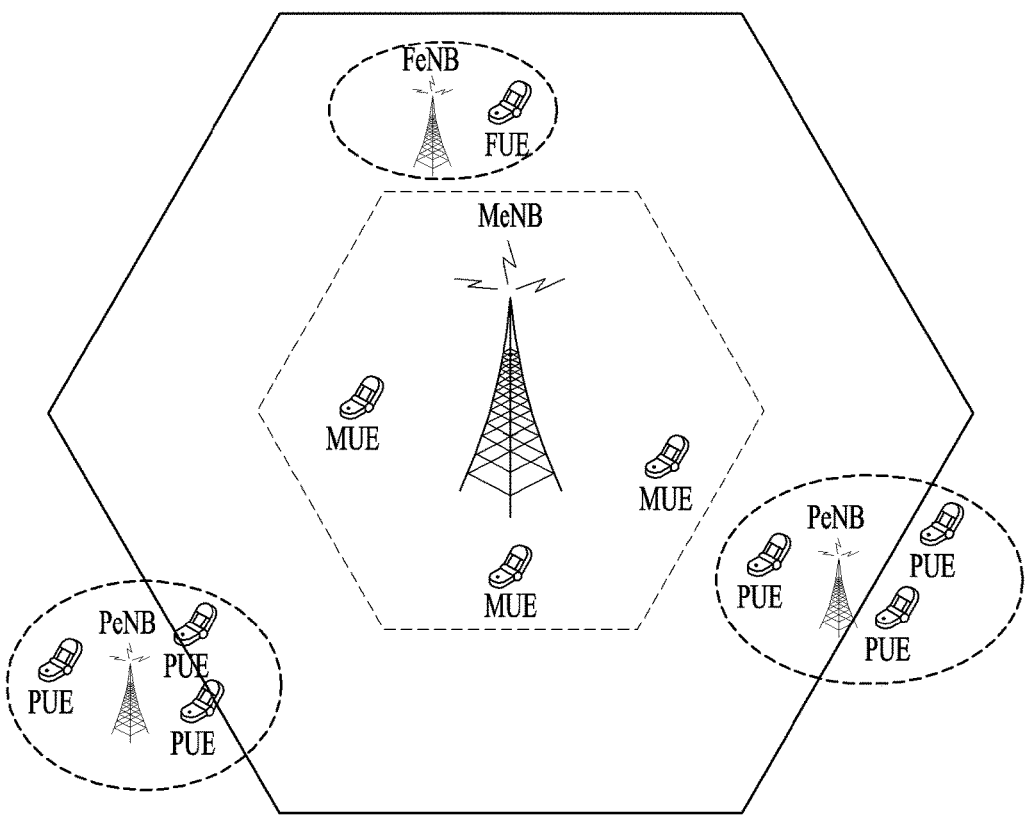
FIG. 1 illustrates a heterogeneous network wireless deployment according to the present invention.

The object of the present invention can be achieved by providing a method for transmitting channel state information (CSI) feedback by a user equipment (UE) with dual connectivity in a heterogeneous cell deployment in which a macro base station (BS) and a small BS coexist, the method including classifying cells set for the UE into one or more cell groups based on cell IDs of the cells, selecting a representative cell representing the other cells among cells included in a cell group with respect to each of the one or more cell groups, and transmitting CSI feedback about the cells included in each of the one or more cell groups to at least one of the macro BS and the small BS using a representative cell selected for the cell group.

The classifying may include classifying the cells into the one or more cell groups by further considering system information block 2 (SIB2)-linkage between the cells and the UE.

The classifying may include, when an incomplete cell group that does not include a cell allocated uplink resource by the SIB2-linkage is present as a result obtained by classifying the cells based on the cell ID, classifying cells included in the incomplete cell group as a cell group including the cells allocated the uplink resource by the SIB2-linkage.

The representative cell may be selected among cells set with SIB2-linkage with the UE.

The method may further include receiving a cross carrier scheduling configuration message indicating to transmit CSI feedback about a cell with link quality less than a threshold value among cells set by the small BS to the macro BS, from the macro eNB, wherein the transmitting may include, when the cross carrier scheduling configuration message is received, CSI feedback of a cell with link equality less than a threshold value to the small BS and the macro BS.

The method may further include receiving a CSI fallback configuration message indicating to forward CSI feedback of some or all of cells set by the small BS to the small BS through the macro BS, from the macro BS, wherein the transmitting may include transmitting the CSI feedback of some or all of the cells to the small BS through the macro BS when the CSI fallback configuration message is received.

In another aspect of the present invention, provided herein is a user equipment (UE) with dual connectivity and for transmitting channel state information (CSI) feedback in a heterogeneous cell deployment in which a macro base station (BS) and a small BS coexist, the UE including a transmitter, a receiver, and a processor connected to the transmitter and the receiver and configured to transmit the CSI feedback, wherein the processor is configured to classify cells set for the UE into one or more cell groups based on cell IDs of the cells, to select a representative cell representing the other cells among cells included in a cell group with respect to each of the one or more cell groups, and to control the transmitter to transmit CSI feedback about the cells included in each of the one or more cell groups to at least one of the macro BS and the small BS using a representative cell selected for the cell group.

Mode for Invention

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or(er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

In addition, the expression that a device communicates with a 'cell' means that the device transmits and receives signals to and from an eNB of the corresponding cell. That is, an actual object to and from which the device transmits and receives signals may be a specific eNB. However, for convenience of description, the device transmits and receives signals to and from a cell formed by the specific cell. Similarly, the terms 'macro cell' and/or 'small cell' may refer to corresponding specific coverage and also refer to 'an eNB for supporting a macro cell' and/or 'a small cell eNB for supporting a small cell'.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each serve corresponding UEs by resource allocation based on cell coordination.

The above small cells are categorized into two types depending on their access schemes of UEs. First, small cells using open access subscriber group (OSG) or non closed subscriber group (Non-CSG) scheme are accessible to UEs connected to a macro cell and/or UEs connected to other small cells. The OSG or Non-CSG scheme enables handover to the small cells from other cells.

Second, small cells using a closed subscriber group (CSG) scheme are not accessible to unauthorized UEs connected to a macro cell and/or unauthorized UEs connected to other small cells. In addition, the CSG scheme does not allow handover to the small cells from other cells.

2. Carrier Aggregation and Dual Connectivity

FIG. 2 is a diagram illustrating carrier aggregation according to the present invention.

Referring to FIG. 2, a communication system may collect a plurality of uplink/downlink component carriers (CCs) to support wider uplink/downlink bandwidths. The term "CC" may be replaced with other equivalent terms (e.g., a carrier, a cell, etc.). CCs may or may not be adjacent to each other in the frequency domain. A bandwidth of CCs may be independently determined. Asymmetrical carrier aggregation with UL CCs and DL CCs, the numbers of which are different, is possible. Control information may be configured to be transmitted and received through a specific CC. The specific CC may be referred to as a primary CC (or an anchor CC) and the remaining CCs may be referred to as a secondary CC.

When cross-carrier scheduling (or cross-CC scheduling) is applied, PDCCH for downlink allocation may be transmitted to DL CC#0, and the corresponding PDSCH may be transmitted to DL CC#2. Moreover, for cross-CC scheduling of LTE-advanced (LTE-A) UEs, the introduction of carrier indicator field (CIF) has been considered. Configuration for the presence or absence of the CIF within PDCCH is semi-statically and UE-specifically (UE-group-specifically) enabled by higher layer signaling (e.g., RRC signaling). The baseline of PDCCH transmission is summarized as below.

1) CIF disabled: PDCCH on a DL CC assigns PDSCH resources on the same DL CC or PUSCH resources on a single linked UL CC 1-1) No CIF 1-2) The same as Rel-8 PDCCH structure (the same coding and the same CCE-based resource mapping) and DCI formats 2) CIF enabled: PDCCH on a DL CC can assign PDSCH or PUSCH resources in one of multiple aggregated DL/UL CCs using the CIF 2-1) LTE DCI format extended with the CIF 2-1-1) CIF (if configured) is a fixed x-bit field (e.g., x=3)

2-1-2) CIF (if configured) location is fixed irrespective of DCI format size 2-2) Reusing LTE PDCCH structure (the same coding and the same CCE-based resource mapping)

The LTE-A system adopts the concept of cell to manage radio resources. The above-described CA deployment may be referred to as a multi-cell deployment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA deployment using more UL CCs than DL CCs may also be supported.

CA may be regarded as aggregation of two or more cells having different carrier frequencies (center frequencies). The term 'cell' used in CA is described from a frequency point of view and should be distinguished from 'cell' that is generally as a geographical area covered by an eNB. Hereinafter, the aforementioned intra-band CA is referred to as intra-band multi-cell and inter-band CA is referred to as inter-band multi-cell.

In the LTE-A system, a primacy cell (PCell) and a secondary cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA deployment. That is, PUCCH allocation and transmission for the UE may take place only in the PCell. In addition, the UE may use only the PCell in acquiring system information or changing a monitoring procedure. An evolved universal terrestrial radio access network (E-UTRAN) may change only a PCell for a handover procedure by a higher-layer RRCConnectionReconfiguraiton message including mobilityControlInfo to a UE supporting CA.

A SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA deployment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA deployment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

FIG. 3 is a diagram illustrating cross scheduling in the case of aggregation of a plurality of carriers according to the present invention.

In the case of presence of CIF, the eNB may assign the PDCCH monitoring DL CC set for reduction of blind decoding complexity at the UE side. The PDCCH monitoring DL CC set is a portion of the entire aggregated DL CCs and includes one or more DL CC, and the UE only performs detection/decoding of PDCCHs on the corresponding DL CC. In other words, upon scheduling PDSCH/PUSCH for a UE, the eNB transmits PDCCHs only through the PDCCH monitoring DL CC set. The PDCCH monitoring DL CC set may be set UE-specifically, UE-group-specifically, or cell-specifically. The term "PDCCH monitoring DL CC" may be replaced with the equivalent terms such as a monitoring carrier, a monitoring cell, etc. In addition, CCs aggregated for the UE may be replaced with the equivalent terms such as a serving CC, a serving carrier, a serving cell, etc.

As illustrated in FIG. 3, three DL CCs may be aggregated. In FIG. 3, DL CC A is configured as the PDCCH monitoring DL CC. DL CC A, B, and C may each be referred to as a serving CC, a serving carrier, a serving cell, etc. When the CIF is disabled, each DL CC can transmit only the PDCCH scheduling its own PDSCH without the CIF according to LTE PDCCH configuration. On the other hand, when the CIF is enabled by UE-specific (or UE-group-specific or cell-specific) higher layer signaling, only DL CC A (monitoring DL CC) can transmit the PDCCHs scheduling not only its own PDSCH but also PDSCHs of the other CCs using the CIF. In this case, no PDCCH is transmitted on DL CC B and C which are not configured as the PDCCH monitoring DL CC. Accordingly, DL CC A (monitoring DL CC) needs to include all of a PDCCH search range associated with DL CC A, a PDCCH search range associated with DL CC B, and a PDCCH search range associated with DL CC C. In this specification, it is assumed that the PDCCH search ranges are defined for the respective carriers.

As described above, LTE-A has considered the introduction of CIF for cross-CC scheduling. Whether the CIF is used (that is, whether a cross-CC scheduling mode or a non-cross-CC scheduling mode is supported) and conversion between modes may be configured via RRC signaling semi-statically/UE-specifically. The UE may perform the RRC signaling and then check whether the CIF is used in PDCCH scheduled to the UE.

FIG. 4 is a diagram for explanation of dual connectivity according to the present invention.

A UE 100 within the coverage of first and second small-cell eNBs 410 and 420 may be connected simultaneously to a small cell and a macro cell by a macro-cell eNB 200. The UE 100 may receive a service from a macro cell or a small cell simultaneously or in a time division multiplying (TDM) scheme. Backhaul between the macro cell and the small cell may be ideal backhaul or non-ideal backhaul.

The UE 100 may receive a service of control plane (C-plane) functionalities (connection management and mobility) through a macro cell layer. In addition, the UE 100 may select user plane (U-plane) functionalities from the macro cell and/or the small cell and receive a service of the U-plane functionalities. FIG. 4 illustrates an embodiment in which a small cell is a data path of the U-plane.

For example, data may be transmitted in real time by a service such as voice over long term evolution (VoLTE). When the UE 100 moves and receives from the VoLTE service from a small cell, interruption of the service may occur frequently. Thus, the UE 100 may receive a service from a macro cell in which continuity is ensured relative to a small cell. On the other hand, the UE 100 may receive a service that requires high efficiency from a small cell.

The macro cell and the small cell may perform carrier aggregation. That is, the macro cell and the small cell may user the respective random n and k (n and k are natural numbers) carriers. In this case, carriers of the macro cell and small cell may be different or some carriers may be commonly used by the macro cell and small cell. For example, the macro cell may use subcarriers with frequencies f1 and f2 and the small cell may use subcarriers with frequencies f2 and f3.

Referring to FIG. 4, the macro-cell eNB 200 and the first small-cell eNB 410 may uses subcarriers with different frequencies F1 and F2. On the other hand, the macro-cell eNB 200 and the second small-cell eNB 420 may use the same frequency band F1 in order to provide a service to the UE 100. The UE 100 configured to have dual connectivity may be simultaneously connected to both a macro cell by the macro-cell eNB 200 and a small cell by the small-cell eNBs 410 and 420.

A detailed description will be given in such a way that the aforementioned dual connectivity is similar to inter-site (or inter-band) carrier aggregation for aggregating carriers in different bands. That is, the detailed description will be given in such a way that a macro cell is a primary cell (PCell) by a primary CCE in carrier aggregation and a small cell is a secondary cell (SCell) by a secondary CC in carrier aggregation.

However, dual connectivity in a heterogeneous network deployment needs to be distinguished from carrier aggregation. That is, dual connectivity between a macro cell and a small cell is interpreted as adding geographical/positional concept, but not carrier aggregation in a single eNB. In more detail, when the UE 100 is positioned in a small cell by the first small-cell eNB 410 or positioned in a small cell by the second small-cell eNB 420, the UE 100 may simultaneously communicate with the first and second small-cell eNBs 410 and 420 that are geographically/positionally separated while receiving a service from the macro-cell eNB 200.

The legacy LTE (Rel-8/9) and LTE-A considers carrier aggregation in order to configure PCell and SCell(s) for one UE by an eNB. The PCell and SCell configured to the UE via carrier aggregation are scheduled by the same scheduler.

However, when a UE has dual connectivity in the aforementioned heterogeneous network deployment (that is, when the UE is simultaneously connected to both a macro cell and a small cell), the UE may be independently scheduled with respect to the macro cell and the small cell from separate schedulers. That is, the UE may be scheduled with the PCell from the macro cell and scheduled with the SCell from the small cell.

The UE having dual connectivity may be allocated resources from different network points (e.g., a master eNB and a secondary eNB) connected via non-ideal backhaul. In this case, the master eNB (MeNB) may function as a mobility anchor to an eNB corresponding to S1-MME connection from a core network (CN) in dual connectivity. A group of serving cells associated with the master eNB may be defined as a master cell group. A secondary eNB (SeNB) is an eNB for providing additional resources for a UE and may be defined to be distinguished from a master eNB (i.e., the SeNB may be defined as an eNB that is not the master eNB). In addition, similarly to a master cell group, a group of serving cells associated with the SeNB may be defined as a secondary cell group.

The following operations of the "macro eNB" and "small eNB" are for convenience and are not limited to a type of an eNB or a cell. That is, the operation of the "macro eNB" may refer to the aforementioned operation of the "MeNB" and the operation of the "small eNB" may refer to the aforementioned operation of the "SeNB". That is, hereinafter, selection of terms is merely an example, and the terms "macro eNB", "small eNB", and so on may be interpreted in various ways according to a type of an eNB or cell.

3. Method for Transmitting CSI Feedback

A UE may transmit channel state information (CSI) to an eNB in order to feedback information of a channel for transmitting and receiving data to and from the eNB to the eNB. The CSI may be a type of uplink control information (UCI) such as acknowledgement/negative acknowledgement (ACK/NACK) and sounding reference signal (SRS) of hybrid automatic repeat request (HARQ). The CSI may include channel quality information (CQI), precoding matrix indicator (PMI), rank indicator (RI), and so on.

In the case of carrier aggregation in a legacy LTE (Rel-8/9), a UE may feedback CSI to an eNB through a physical uplink control channel (PUCCH) or physical uplink shared channel (PUSCH) of a PCell. Alternatively, the UE may feedback CSI through a PUSCH of a SCell with a smallest SCellindex among SCells for transmitting a PUSCH.

In the aforementioned dual connectivity deployment, a macro cell (i.e., macro eNB for supporting a macro cell) and a small cell (i.e., a small eNB for supporting a small cell) may be connected via ideal backhaul or non-ideal backhaul and may each perform scheduling for the UE. In consideration of this, there is a need to propose a method for feeding back CSI associated with the macro/small eNB by a UE set with dual connectivity. For example, the UE may feedback the CSI associated with the macro eNB to the macro eNB and feedback the CSI associated with the small eNB to the small eNB. Hereinafter, a detailed method for feeding back CSI of macro/small eNBs by a UE will be described.

Figure 5:
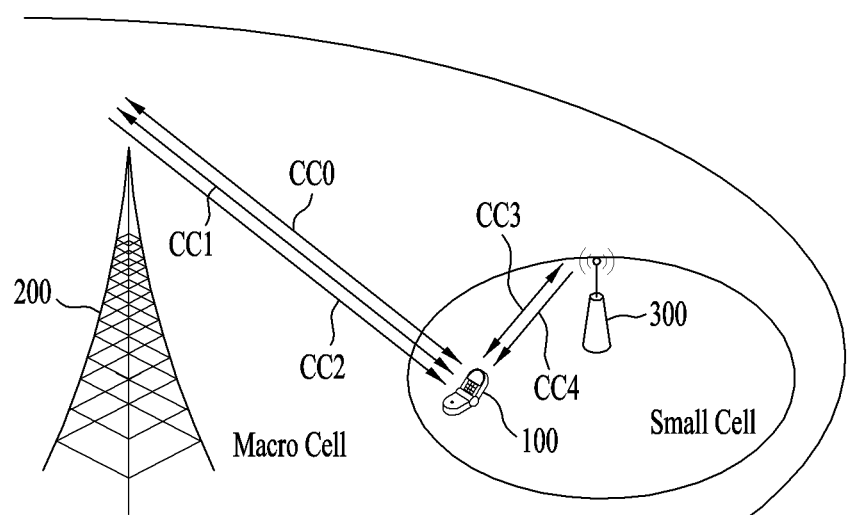
FIG. 5 is a diagram illustrating a channel state information (CSI) feedback method according to an embodiment of the present invention.

FIG. 5 is a diagram illustrating a CSI feedback method according to an embodiment of the present invention.

First, in order to feedback CSI about cells (PCell or SCell) set from eNBs connected to a UE set with dual connectivity, the UE may transmit the CSI to each eNB. In this case, when one eNB allocates two or more cells for a UE, a cell that is used by the UE in order to transmit CSI to an eNB among the two or more cells may be referred to as a virtual PCell. The virtual PCell may be interpreted as the same as a PCell in conventional carrier aggregation in that the virtual PCell is used to feedback information about two or more cells. However, the virtual PCell and the conventional PCell may not be always the same, and in some embodiments of the present invention, a different PCell from the conventional PCell may be set as the virtual PCell among two or more cells. For example, the virtual PCell may be arbitrarily selected among cells allocated with uplink resources and thus a different PCell from the conventional PCell may be selected as the virtual PCell.

In addition, cells for feedback together with macro/small eNBs using the virtual PCell by the UE may be referred to as one cell group. In summary, CSI feedback for cells included in each cell group may be transmitted to an eNB using the virtual PCell (i.e., representative cell representing other cells of the cell group).

The embodiment of FIG. 5 will now be described. A UE 100 may have dual connectivity with a macro eNB 200 and a small eNB 300. That is, the UE 100 may be connected to both a macro cell by the macro eNB 200 and a small cell by the small eNB 300 to receive a service. The macro eNB 200 may set three cells, that is, three CCs (CC 0 (cell index 0), CC 1 (cell index 1), and CC 2 (cell index 2)) for the UE 100, and the small eNB 300 may set two cells, that is, two CCs (CC 3 (cell index 3) and CC 4 (cell index 4)) for the UE 100.

The macro eNB 200 and the small eNB 300 may have different PCIDs (physical cell IDs), and in the illustrated embodiment, the macro eNB 200 may have a PCID of '10' and the small eNB 300 may have a PCID of '11'.

The UE 100 may set a cell group for CSI feedback and set a cell group index for distinguishing cell groups. In addition, the UE 100 may select a virtual PCell to be used for CSI feedback for each cell group and transmit CSI of sets set with the same cell group index as the virtual PCell to an eNB.

In FIG. 5, a cell group index '0' may be allocated to three cells allocated by the macro eNB 200 and a cell group index '1' may be allocated to two cells allocated by the small eNB 300. The UE 100 may select a virtual PCell for each cell group and feedback CSI through the virtual PCell. For example, the UE 100 may set CC 0 as the virtual PCell for CSI feedback for the three cells allocated by the macro eNB 200. Accordingly, the UE 100 may transmit CSI of CC 0, CC 1, and CC 2 with a cell group index '0' to CC 0 as the virtual PCell for the macro eNB 200. Similarly, the UE 100 may set CC 3 as the virtual PCell for the CSI for the small eNB 300. Then the UE 100 may transmit CC 3 and CC 4 with a cell group index '1' to CC 3 as the virtual PCell for the small eNB 300

Figure 6:
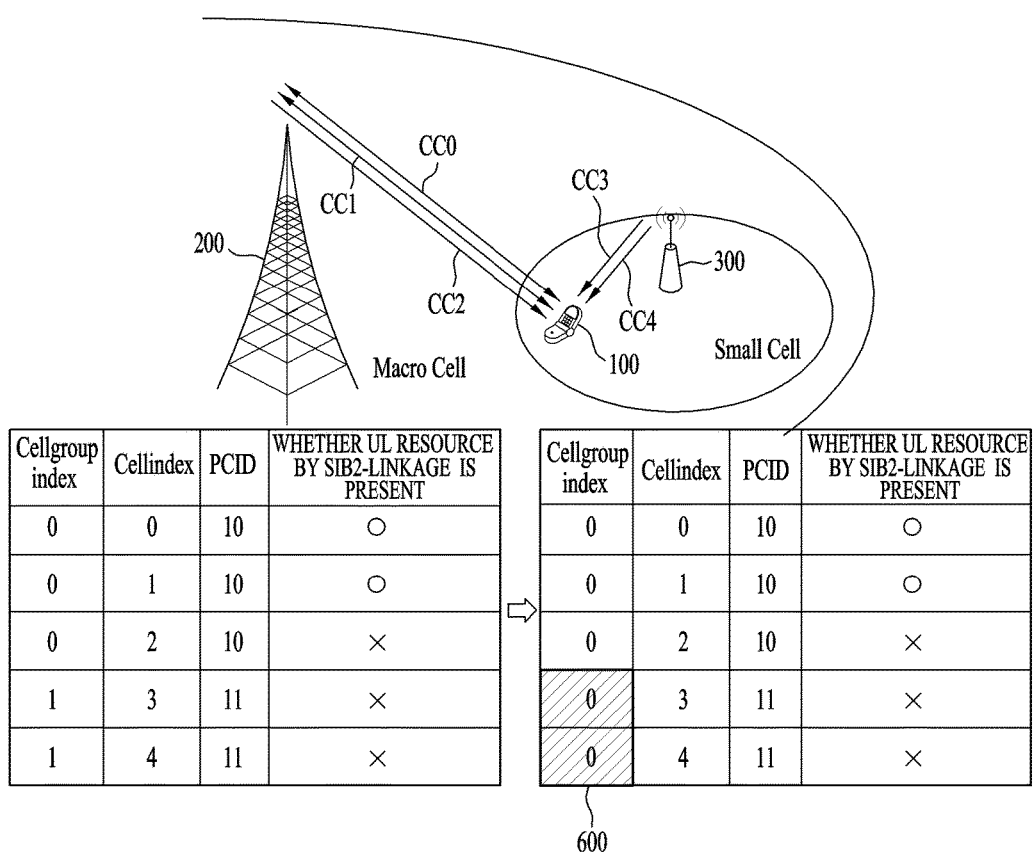
FIG. 6 is a diagram illustrating a CSI feedback method according to another embodiment of the present invention.

FIG. 6 is a diagram illustrating a CSI feedback method according to another embodiment of the present invention. With reference to FIG. 6, a detail embodiment for setting a cell group and a virtual PCell will be described.

For CSI feedback of the UE 100 with dual connectivity, the UE 100 and/or the macro eNB 200 connected to the UE 100 may define and set a cell group. Hereinafter, factors to be considered in a procedure of setting a cell group.

First, in order to independently perform CSI for each eNB connected to the UE 100, a cell group may be set in consideration of a PCID (or E-UTRAN cell global identifier (ECGI)) of cells set for the UE 100. That is, the UE 100 may classify cells set for the UE 100 according to a cell ID (e.g., PCID or ECGI) and set cells with the same PCID (or ECGI) as one cell group. One or more cell groups may be set according to the number of eNBs connected to the UE 100.

In the illustrated embodiment, CC 0, CC 1, and CC 2 that are allocated to the UE 100 by the macro eNB 200 may have a PCID of '10'. Accordingly, the UE 100 may set CC 0, CC 1, and CC 2 to one cell group and allocate cell group index '0'. Similarly, CC 3 and CC 4 that are allocated to the UE 100 by the small eNB 300 is may have a PCID of '11' and may be allocated to another cell group to which cell group index '1' is allocated.

Second, in order to perform CSI feedback, the UE needs to be allocated uplink (UL) resources from an eNB. Accordingly, during a procedure for setting a cell group, system information block 2 (SIB2)-linkage between each cell and a UE may be considered. When a cell that is set with SIB2-linkage and allocated UL resource for transmission of CSI feedback is not present among cells contained in a specific cell group, the UE 100 may not perform CSI feedback. Accordingly, a cell set with at least one SIB2-linage needs to be present in a cell group.

In the left table of FIG. 6, a cell group allocated cell group index '0' may include two cells (CC 0 and CC 1) allocated UL resource by SIB2-linkage. On the other hand, a problem may arise in that a cell allocated UL resource for transmission of CSI feedback is not present in a cell group allocated cell group index '1'. Accordingly, cells set to a UE need to consider whether UL resource is allocated by SIB2-linkage but may be classified into one or more cell group.

Third, during a procedure for setting a cell group, a cell group may be set in consideration of both the aforementioned PCID (or ECGI) and the SIB2-linkage. That is, a cell group may be primarily set in consideration of a PCID (or ECGI). Then, secondarily, in consideration of SIB2-linage, the cell group that has been primarily set may be adjusted with respect to a cell group (e.g., an incomplete cell group) in which any cell allocated UL resource by SIB2-linage is not present in the cell group that has been primarily set.

In the illustrated embodiment, CC 3 and CC 4 are each a cell that is not allocated UL resource by SIB2-linage. Accordingly, in the left table of FIG. 6, a problem may arise when CC 3 and CC 4 are each set to a separate cell group with cell group index '1'. According to the present embodiment, in order to overcome this problem, a cell group may be adjusted such that CC 3 and CC 4 contained in the incomplete cell group are included in a cell group with cell group index '0' (600 in the right table of FIG. 6).

That is, CC 3 and CC 4 may be set as a cell group in which a cell with SIB2-linage is present. Accordingly, CC 3 and CC 4 may be set to belong to cell group index '0' together with CC 0, CC 1, and CC 2 and may be fed back to the macro eNB 200 through a virtual PCell of the same cell group. Then CC 3 and CC 4 may be transmitted to the small eNB 300 in consideration of delay, throughput, and so on of backhaul connected between the small eNB 300 and the macro eNB 200.

Hereinafter, a procedure for setting a cell group by the UE 100 and the macro eNB 200 in consideration of the aforementioned various conditions will be described in detail.

According to a first embodiment of the present invention, the macro eNB 200 may set a cell group with respect to cells set for the UE 100 and set a cell group index. Information about a cell group set by the macro eNB 200 may be included in an RRC (re)configuration message and transmitted to the UE 100.

The aforementioned cell group index may be included in the RRC (re)configuration message and transmitted separately from a cell index. Alternatively, the cell group index may be transmitted as a portion of a cell index included in the RRC (re)configuration message. That is, when a cell index is configured with 5 bits, higher two bits of 5 bits may be configured with a cell group index and a lower three bits may be configured with a cell index.

Upon receiving the RRC (re)configuration message from the macro eNB 200, the UE 100 may know how a cell group is set and perform CSI feedback based on the information. That is, the UE 100 may know a cell, CSI of which need to be feedback to the macro eNB 200.

In addition, the macro eNB 200 may transmit information about a cell group to the small eNB 300 connected to the UE 100. The information about the cell group may be included in CSI feedback information message and transmitted to the small eNB 300 and may be transmitted to the small eNB 300 through an X2 interface and so on of backhaul from the macro eNB 200. The CSI feedback information message may be configured to include at least one of "a field indicating a message type, a field indicating C-RNTI of a UE in each cell group, a field indicating a cell index and cell group index set for a UE, a field indicating a PCID of each eNB, a field indicating a PCID (or an ECGI) of a macro eNB, and/or a field indicating a PCID (or an ECGI) of a small eNB".

The small eNB 300 that receives the CSI feedback information message may know an eNB to which CSI feedback is transmitted and may also know an eNB to which CSI feedback received for a specific eNB needs to be forwarded through backhaul.

According to a second embodiment of the present invention, upon receiving a RRC (re)configuration message from the macro eNB 200, the UE 100 may set a cell group according to a preset condition. Then, information about the cell group and cell group index set by the UE 100 may be transmitted to the macro eNB 200 through a RRC (re) configuration complete message.

That is, the UE 100 may set a cell group according to the aforementioned various conditions. Accordingly, the macro eNB 200 that receives the information about the cell group may include this information in CSI feedback information message and transmit the information to another small eNB 300 connected to the UE 100 through an X2 interface and so on.

According to a third embodiment of the present invention, the UE 100 and the macro eNB 200 may each set a cell group according to a predefined method. The UE 100 may acquire information about cells and set a cell group based on the RRC (re)configuration message received from the macro eNB 200. On the other hand, the macro eNB 200 may set a cell group using information about the cells set for the UE 100. When a cell group is set, the macro eNB 200 may include information about a cell group in the CSI feedback information message and transmit the information to another eNB (e.g., the small eNB 300) connected to the UE 100.

As described above, a cell group may be set by the UE 100 and/or the macro eNB 200 using various methods. Hereinafter, a detailed procedure for setting a virtual PCell after a cell group is set will be described.

First, the UE 100 and/or the macro eNB 200 may set a virtual PCell during a procedure for setting a cell group. When a virtual PCell is set by the macro eNB 200, the macro eNB 200 may add a field indicating a virtual PCell indicator to an RRC (re)configuration message and transmit the field to the UE 100. When a virtual PCell is set by the UE 100, the UE 100 may add a field indicating a virtual PCell indicator to the RRC (re)configuration complete message and transmit the field to the macro eNB 200.

The virtual PCell may be selected among cells set with SIB2-linkage. That is, the virtual PCell is a set used to perform CSI feedback by the UE 100, and thus may be selected among cells allocated UL resource. Furthermore, the virtual PCell may be selected as a cell with a highest or lowest cell index among cells set with SIB2-linkage.

A condition for selecting the virtual PCell needs to be known by both the UE 100 and the macro eNB 200 before a cell group is set via consultation between the UE 100 and the macro eNB 200. Accordingly, the UE 100 may know a cell to which CSI feedback information of each cell group needs to be transmitted. Furthermore, the macro eNB 200 may know an eNB on which CSI feedback is performed by the UE 100. In addition, the macro eNB 200 may know an eNB to which the CSI feedback information about a specific eNB, received from the UE 100, needs to be forwarded.

According to the aforementioned embodiment, the UE 100 may perform CSI feedback for each cell group through the virtual PCell. That is, the UE 100 may transmit CSI feedback information about cells with the same cell group index to an eNB through the virtual PCell of the cell group.

FIG. 7 is a diagram for explanation of a CSI feedback method according to another embodiment of the present invention. In FIGS. 5 and 6, a UE may feedback the virtual PCell and cells (i.e., cells belonging to one cell group) the same cell group index together. On the other hand, the UE may feedback CSI of cells (i.e., cells belonging to different cell groups) with different cell group indexes. This embodiment will be described with reference to FIGS. 7 to 10.

First, with reference to FIGS. 7 and 8, cross carrier scheduling that is performed by a macro eNB on a small cell will be described.

When the macro eNB performs cross carrier scheduling on a cell by the small eNB, a UE may feedback CSI about the small eNB to the macro eNB. That is, even if cells set from the small eNB and the macro eNB belong to different cell groups, the UE may transmit CSI feedback about the small eNB to the macro eNB.

In detail, for example, when small eNBs use the same frequency resource in an deployment in which small cells are densely arranged, small eNBs may interfere. In particular, the macro eNB may perform cross carrier scheduling on a specific small cell by a specific small eNB in order to overcome interference between physical downlink control channels (PDCCHs).

When the macro eNB performs cross carrier scheduling on the small cell, a PCell may be set for a macro eNB cell group by the macro eNB and a SCell may be set for a small eNB cell group by the small eNB. In this case, the UE may transmit CSI feedback by the small eNB to the macro eNB as well as the small eNB. That is, even if a cell group index of cells set from the small eNB is different from that of cells set from the macro eNB, the UE may transmit CSI feedback by the small eNB to the macro eNB.

In other words, even if the UE transmits CSI feedback to the macro eNB and the small eNB, the UE may transmit CSI feedback about some or all of cells to be transmitted to the small eNB to the macro eNB. That is, when link quality of some or all of the cells set for the UE from the small eNB is not good (e.g., signal to interference plus noise ratio (SINR)) of a specific cell), the UE may transmit CSI feedback about the corresponding cell to the macro eNB.

In the present embodiment, the small eNB may transmit a cross carrier scheduling request message to the macro eNB. The cross carrier scheduling request message may be a message that requests the macro eNB to instead receive feedback of a specific cell among cells set for the UE from the small eNB. The cross carrier scheduling request message may be configured to include at least one of "a field indicating a message type, a field indicating C-RNTI of a UE in a macro eNB or a small eNB, a field indicating a PCID (or an ECGI) of a small eNB, a field indicating a PCID (or an ECGI) of a macro eNB, and/or a field indicating cell information" and may be transmitted through backhaul such as an X2 interface between the small eNB and the macro eNB.

FIG. 7 is a diagram illustrating a case in which a field indicating cell information in the aforementioned cross carrier scheduling request message is embodied, according to an embodiment of the present invention. Upon requesting cross carrier scheduling for a UE to the macro eNB, the small eNB may set a bit about a cell that requests the macro eNB to instead receive feedback to '1' and set a bit about the other cells to '0' to configure a cross carrier scheduling request message. In the illustrated embodiment, the small eNB may determine to receive CSI feedback directed from the UE with respect to cells with cell indexes 0, 1, 2, and 3. On the other hand, the small eNB may request the macro eNB to instead receive feedback for the reason such as link quality with respect to a cell with cell index 4.

The macro eNB that receives the cross carrier scheduling request message from the small eNB may determine whether cross carrier scheduling for the small eNB is performed in consideration of a load status and so on of the macro eNB. When the macro eNB determines to perform the cross carrier scheduling for instead receiving the CSI feedback, the macro eNB may transmit a cross carrier scheduling response message to the small eNB.

The cross carrier scheduling response message may be configured to include at least one of "a field indicating a message type, a field indicating C-RNTI of a UE in a macro eNB or a small eNB, a field indicating a PCID (or an ECGI) of a small eNB, a field indicating a PCID (or an ECGI) of a macro eNB, and/or a field indicating cell information". The field indicating the cell information may indicate a cell on which the macro eNB determines to perform cross carrier scheduling among cells to which the small eNB requests cross carrier scheduling. For example, the small eNB requests cross carrier scheduling on cell indexes 3 and 4 but the macro eNB may determine to perform the cross carrier scheduling only on cell index 4. In this case, the macro eNB may set a bit about cell index 4 and transmit the cross carrier scheduling response message to the small eNB, as illustrated in FIG. 7.

FIG. 8 is a diagram for explanation of a CSI feedback method according to another embodiment of the present invention. FIG. 8 is a flowchart of cross carrier scheduling of a macro eNB with regard to FIG. 7. In FIG. 8, a repeated description of FIG. 7 will be omitted herein.

As described above, the small eNB may determine the macro eNB to perform cross scheduling with respect to some cells for the reason such as link quality. Accordingly, the small eNB may transmit a cross carrier scheduling request message to the macro eNB (S810). The cross carrier scheduling request message may include a field indicating the cell information illustrated and described with reference to FIG. 7.

Then the macro eNB may determine to perform cross carrier scheduling according to request of the small eNB and transmits a cross carrier scheduling response message to the small eNB (S820). The cross carrier scheduling response message may include a cell information field indicating that the small eNB performs cross carrier scheduling on some or all of cells requested by the small eNB.

The small eNB that receives the cross carrier scheduling response message may know that the macro eNB receives feedback instead of a cell of the small eNB. The small eNB may transmit resource information about a corresponding specific cell to the macro eNB such that the macro eNB performs cross carrier scheduling. Alternatively, the small eNB may receive resource information about a corresponding specific cell on which the macro eNB performs cross carrier scheduling, from the macro eNB.

In this case, the resource information contained in the message transmitted and received between the small eNB and the macro eNB may be represented in units of physical resource blocks (PRBs). Each PRB unit may be indicated using one bit, a bit indicating PRB allocated to a specific cells may be represented as '1' and a bit indicating the other PRBs may be indicated a bit '0'.

The macro eNB that determines to perform cross carrier scheduling needs to notify the UE of this fact. Accordingly, the macro eNB may transmit a cross carrier scheduling configuration message to the UE (S830). In addition, the cross carrier scheduling configuration message may include a field indicating the aforementioned cell information.

The cross carrier scheduling message may be transmitted to the UE through a RRC connection (re)configuration message or a MAC control element in order to more dynamically perform cross carrier scheduling than in the case of the RRC connection (re)establishment message. Unlike in FIG. 8, the cross carrier scheduling configuration message may be transmitted to the UE by the small eNB instead of the macro eNB.

The UE that receives the cross carrier scheduling configuration message may transmit a cross carrier scheduling complete message indicating that a message is appropriately received (S840). Then the UE may perform CSI feedback. The UE may transmit CSI feedback about a cell that determines to perform cross carrier scheduling by the macro eNB among cells set from the small eNB to the macro eNB (PCell in cross carrier scheduling) as well as the small eNB (i.e., virtual PCell of cell group of small eNB).

Furthermore, the UE may also perform blind decoding on the PCell of the macro eNB in order to a PDCCH (DCI format) for scheduling of cells that determine to perform cross carrier scheduling. The macro eNB may perform cross carrier scheduling in the PCell of the macro eNB for the UE.

Figure 9:
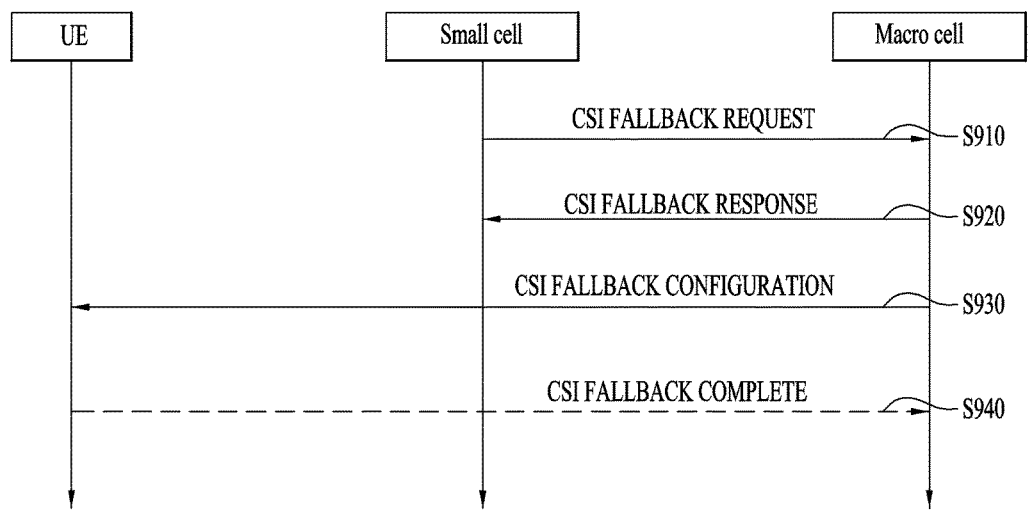
FIG. 9 is a diagram for explanation of a CSI feedback method according to another embodiment of the present invention.

FIG. 9 is a diagram for explanation of a CSI feedback method according to another embodiment of the present invention. Unlike in FIGS. 7 and 8, FIGS. 9 and 10 illustrates an embodiment in which some or all of cells set by a small eNB are CSI-fallback by the macro eNB.

When the macro eNB supports the UE in frequency division duplex (FDD) or time division duplex (TDD) and the small eNB supports the UE in TDD, the PCell of the macro eNB may instead receive CSI feedback from the UE with respect to some or all of SCells set by the small eNB. That is, when the UE feedbacks CSI about cells set by the small eNB through the PCell set by the macro eNB, the macro eNB may transmit the CSI feedback to the small eNB through backhaul such as an X2 interface with the small eNB. In this case, feedback may be more rapidly forwarded to the small eNB than in the case in which the UE transmits CSI feedback directed to the small eNB. The CSI fallback may be applied to the case in which TDD configurations of the macro eNB and the small eNB are configured to be different.

Figure 10:
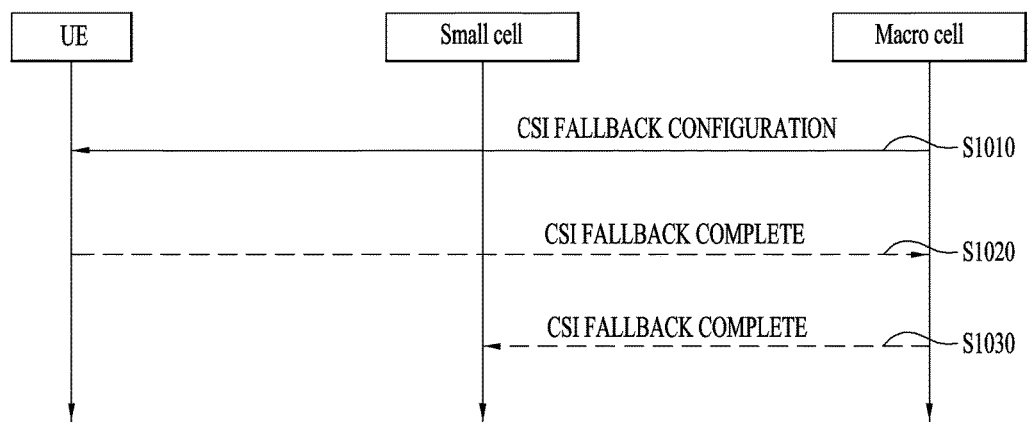
FIG. 10 is a diagram for explanation of a CSI feedback method according to another embodiment of the present invention.

FIG. 9 illustrates the case in which a small eNB determines CSI fallback. FIG. 10 illustrates the case in which the macro eNB determines CSI fallback.

When the UE performs CSI feedback on each of a small eNB and a macro eNB, the small eNB may determine that CSI feedback is more rapidly transmitted from the macro eNB through backhaul with the macro eNB than in the case in which the small eNB receives CSI feedback of the small eNB directly from the UN. In this case, the small eNB may transmit a CSI fallback request message to the macro eNB (S910). The CSI fallback request message may include at least one of "a field indicating a message type, a field indicating a PCID (or an ECGI) of a small eNB, a field indicating a PCID (or an ECGI) of a macro eNB, a field indicating a C-RNTI of a UE in the small eNB or the macro eNB, and/or a field indicating cell information as a target of fallback. In this case, the field indicating the cell information may be configured like in FIG. 7 and may fallback CSI to the macro cell to indicate information about a cell as a transmission target. A cell as a fallback and transmission target may correspond to some or all of cells on which CSI feedback is performed from the UE.

The macro eNB may determine whether CSI feedback of the small eNB can be forwarded to the UE in consideration of a PUCCH resource situation and so on in the PCell of the macro eNB. When the macro eNB can support CSI fallback of the small eNB, the macro eNB may transmit a CSI fallback response message to the small eNB (S920). The CSI fallback response message may be configured to include at least one of "a field indicating a message type, a field indicating a PCID (or an ECGI) of a macro eNB, a field indicating a PCID of a small eNB, a field indicating C-RNTI of a UE in a small eNB or a macro eNB, and/or a field indicating cell information as a fallback target" and may be transmitted through backhaul between the small eNB and the macro eNB.

The macro eNB that determines CSI fallback may know that CSI feedback information about the small eNB is received from the UE to a (virtual) PCell. In addition, the macro eNB may know that the received small eNB CSI feedback information needs to be forwarded to the small eNB. The s mall eNB that receives the CSI fallback response message may know that CSI feedback about the small eNB is not received any more from the UE.

Then the macro eNB that determines CSI fallback may transmit a CSI fallback configuration message to the UE (S930). The CSI fallback configuration message may be transmitted to the UE from the small eNB that receives the CSI fallback response message. The CSI fallback configuration message may be configured to include at least one of "a field indicating a message type, a field indicating C-RNTI of a UE in a small eNB or a macro eNB, a field indicating a PCID (or an ECGI) of a macro eNB, a field indicating a PCID (or an ECGI) of a small eNB, and/or a field indicating cell information as a fallback target".

The CSI fallback configuration message may be transmitted to the UE through the RRC connection (re)configuration message and transmitted through a MAC control element from the macro eNB. The UE may transmit a CSI fallback complete message indicating that the CSI fallback configuration message is received, to the macro eNB (S940). The CSI fallback complete message may be configured similarly to the CSI fallback configuration message.

Then the UE may transmit CSI feedback about the small eNB to the macro eNB instead of the small eNB. That is, the UE may feedback cells of the small eNB and cells of the macro eNB, with different cell group indexes, to the macro eNB.0

FIG. 10 is a diagram for explanation of a CSI feedback method according to another embodiment of the present invention. Unlike in FIG. 9, FIG. 10 illustrates an embodiment in which a macro eNB determines CSI fallback.

Upon determining that the macro eNB instead of a small eNB more rapidly forward CSI feedback transmitted to the small eNB from a UE, the macro eNB may transmit a CSI fallback configuration message to the UE (S1010). That is, the macro eNB may determine CSI fallback without request of the small eNB. The CSI fallback configuration message may be configured in the same or similar way to FIG. 9.

The UE that receives the CSI fallback configuration message may transmit a CSI fallback complete message to the macro eNB in response to the CSI fallback configuration message (S1020). The macro eNB that receives the CSI fallback complete message from the UE may forward the CSI fallback complete message to the small eNB (S1030). The small eNB that receives this message may not expect to receive CSI any more from the UE. The CSI fallback complete message may also be configured in the same or similar way to FIG. 9.

The UE that transmits the CSI fallback complete message to the macro eNB may transmit CSI feedback about the small eNB to the macro eNB. The macro eNB that transmits the CSI fallback configuration message to the UE or receives the CSI fallback complete message from the UE may pre-know that CSI feedback of the small eNB is received from the UE.

Thus far, CSI feedback through a PUCCH has been described but the pre sent invention is not limited thereto. That is, ACK/NACK feedback, RI, PMI, SRS, and so on as other UCI may be similarly applied to the aforementioned embodiments.

4. Apparatus Structure

Figure 11:
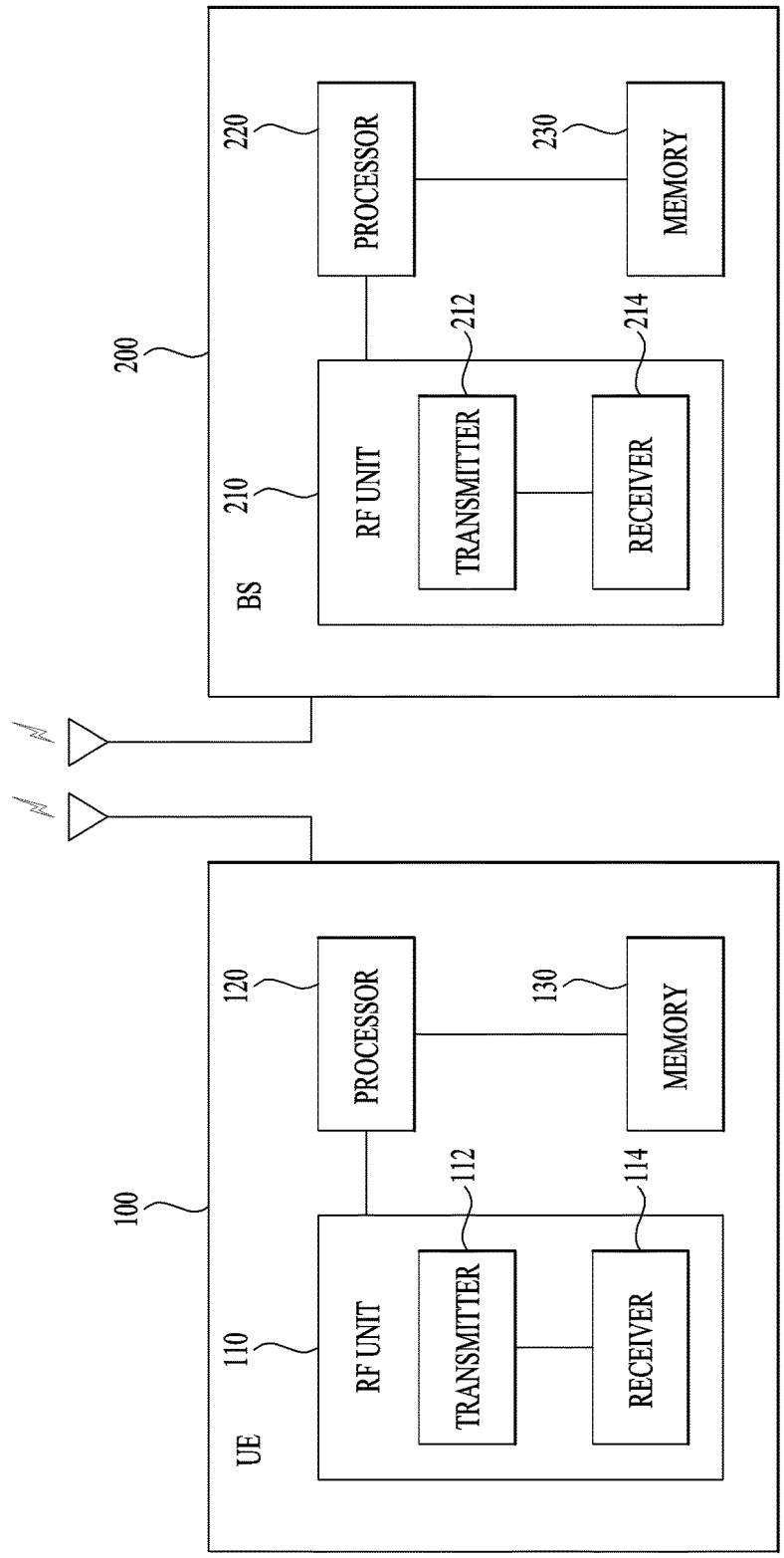
FIG. 11 is a block diagram of a structure of a UE and an eNB according to an embodiment of the present invention.

FIG. 11 is a block diagram of a structure of a UE 100 and an eNB 200 according to an embodiment of the present invention.

In FIG. 11, the UE 100 and the eNB 200 may include radio frequency (RF) units 110 and 210, processors 120 and 220, and memories 130 and 230, respectively. Although FIG. 11 illustrates a 1:1 communication environment between the UE 100 and the eNB 200, a communication environment between a plurality of UEs and the eNB 200 can also be established. In addition, the eNB 200 of FIG. 11 can be applied to both a macro cell eNB and a small cell eNB.

The RF units 110 and 210 may include transmitters 112 and 212 and receivers 114 and 214, respectively. The transmitter and 112 and the receiver 114 of the UE 100 may be configured to transmit and receive signals to and from the eNB 200 and other UEs and the processor 120 may be functionally connected to the transmitter 112 and the receiver 114 to control a process of transmitting and receiving signals to and from other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the eNB 200 may be configured to transmit and receive signals to and from other eNBs and UEs and the processor 220 may be functionally connected to the transmitter 212 and the receiver 214 to control a process of transmitting and receiving signals to and from other devices by the transmitter 212 and the receiver 214. The processor 220 performs various processing processes on signals to be transmitted and then transmits the processed signals to the transmitter 212 and performs processing on the signals received by the receiver 214. As necessary, the processor 220 may store information contained in exchanged message in the memory 230. Based on this structure, the eNB 200 can perform various methods according to the aforementioned embodiments of the present invention.

The processors 120 and 220 of the UE 100 and the eNB 200 requests (e.g., controls, manipulates, manages, etc.) operations of the UE 100 and the eNB 200, respectively. The processors 120 and 220 may be connected to the memories 130 and 230 for storing program codes and data, respectively. The memories 130 and 230 may be connected to the processors 120 and 220 to stores operating system (OS), an application, and general files.

The processors 120 and 220 according to the present invention can also be called a controller, a microcontroller, a microprocessor, a microcomputer, etc. The processors 120 and 220 may be embodied in the form of hardware, firmware, software, or a combination thereof. When an embodiment of the present invention is embodied using hardware, the processors 120 and 220 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

The embodiments of the present invention may have the following advantageous effects.

First, in a heterogeneous cell deployment, dual connectivity with an adjacent cell to a UE may be configured to remove influence of interference due to a relation with the adjacent cell.

Second, in the heterogeneous cell deployment, influence of a DL interference signal received from the adjacent cell by the UE and influence of a UL interference signal transmitted to the adjacent cell from the UE can be reduced.

Third, dual connectivity can be configured by the UE as well as an eNB. Thus, even if a communication system deployment and a network situation are changed, reliable dual connectivity configuration may be possible.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A method for transmitting channel state information (CSI) feedback by a user equipment (UE) with dual connectivity in a heterogeneous cell deployment in which a macro base station (BS) and a small BS coexist, the method performed by the UE and comprising:
    classifying cells set for the UE into one or more cell groups based on cell IDs of the cells;
    selecting a representative cell representing other cells among cells included in a cell group of the one or more cell groups;
    receiving a cross carrier scheduling configuration message from the macro BS indicating to transmit CSI feedback to the macro BS about a cell with link quality less than a threshold value among cells set by the small BS; and
    transmitting the CSI feedback to the small BS and the macro BS using the selected representative cell.

2. The method according to claim 1, wherein the classifying comprises considering system information block 2 (SIB2)-linkage between the cells and the UE.

3. The method according to claim 2, wherein the classifying further comprises:
    determining that an incomplete cell group not including a cell allocated an uplink resource by the SIB2-linkage is present as a result of classifying the cells based on the cell IDs; and
    classifying cells included in the determined incomplete cell group as a cell group including the cells allocated the uplink resource by the SIB2-linkage.

4. The method according to claim 1, wherein the representative cell is selected among cells set with SIB2-linkage with the UE.

5. The method according to claim 1, further comprising:
    receiving a CSI fallback configuration message from the macro BS indicating to transmit CSI feedback of at least some cells set by the small BS; and
    transmitting the CSI feedback to the small BS through the macro BS.

6. A user equipment (UE) with dual connectivity and for transmitting channel state information (CSI) feedback in a heterogeneous cell deployment in which a macro base station (BS) and a small BS coexist, the UE comprising:
    a transmitter configured to transmit information;
    a receiver configured to receive information; and
    a processor connected to the transmitter and the receiver and configured to:
    classify cells set for the UE into one or more cell groups based on cell IDs of the cells;
    select a representative cell representing other cells among cells included in a cell group of the one or more cell groups;
    control the receiver to receive a cross carrier scheduling configuration message from the macro BS indicating to transmit CSI feedback to the macro BS about a cell with link quality less than a threshold value among cells set by the small BS; and
    control the transmitter to transmit the CSI feedback to the small BS and the macro BS using the selected representative cell.

7. The UE according to claim 6, wherein the classifying further comprises considering system information block 2 (SIB2)-linkage between the cells and the UE.

8. The UE according to claim 7, wherein the classifying further comprises:
    determining that an incomplete cell group not including a cell allocated an uplink resource by the SIB2-linkage is present as a result of classifying the cells based on the cell IDs; and
    classifying cells included in the incomplete cell group as a cell group including the cells allocated the uplink resource by the SIB2 -linkage.

9. The UE according to claim 6, wherein the representative cell is selected among cells set with SIB2-linkage with the UE.

10. The UE according to claim 6, wherein the processor is further configured to:
    control the receiver to receive a CSI fallback configuration message from the macro BS indicating to transmit CSI feedback of at least some cells set by the small BS; and
    control the transmitter to transmit the CSI feedback of some or all of the cells to the small BS through the macro BS.

* * * * *